(12) United States Patent
Lesartre et al.

(10) Patent No.: US 7,903,556 B2
(45) Date of Patent: Mar. 8, 2011

(54) METHOD OF CONTROLLING DATA TRANSFERS BETWEEN NODES IN A COMPUTER SYSTEM

(75) Inventors: Gregg Bernard Lesartre, Fort Collins, CO (US); Michael Joseph Phelps, Cheyenne, WY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1143 days.

(21) Appl. No.: 11/266,549

(22) Filed: Nov. 3, 2005

(65) Prior Publication Data

US 2007/0097953 A1 May 3, 2007

(51) Int. Cl.
*G01R 31/08* (2006.01)
(52) U.S. Cl. .................... 370/231; 370/236.2
(58) Field of Classification Search .......... None
See application file for complete search history.

(56) References Cited

U.S. PATENT DOCUMENTS

| | | | |
|---|---|---|---|
| 4,787,033 A | 11/1988 | Bomba et al. | |
| 4,811,201 A | 3/1989 | Rau et al. | |
| 4,845,722 A | 7/1989 | Kent et al. | |
| 4,887,076 A | 12/1989 | Kent et al. | |
| 5,020,020 A | 5/1991 | Pomfret et al. | |
| 5,255,368 A | 10/1993 | Barry | |
| 5,379,292 A * | 1/1995 | Kurata et al. | 370/216 |
| 5,841,775 A | 11/1998 | Huang | |
| 5,841,989 A | 11/1998 | James et al. | |
| 6,098,133 A | 8/2000 | Summers et al. | |
| 7,103,807 B2 * | 9/2006 | Bosa et al. | 714/43 |
| 7,234,023 B2 * | 6/2007 | Abe et al. | 711/114 |
| 7,307,948 B2 * | 12/2007 | Infante et al. | 370/225 |
| 7,370,147 B2 * | 5/2008 | Nakamura et al. | 711/114 |
| 7,436,845 B1 * | 10/2008 | Rygh et al. | 370/413 |
| 7,639,616 B1 * | 12/2009 | Manula et al. | 370/235 |
| 2004/0013088 A1 * | 1/2004 | Gregg | 370/235 |
| 2006/0050639 A1 | 3/2006 | Stuart et al. | |
| 2009/0003211 A1 * | 1/2009 | Akyamac et al. | 370/235 |

FOREIGN PATENT DOCUMENTS

| | | |
|---|---|---|
| EP | 0996126 A1 | 4/2000 |
| GB | 2256295 A | 12/1992 |
| WO | WO 96/17460 A1 | 6/1996 |

* cited by examiner

*Primary Examiner* — Jayanti K Patel
*Assistant Examiner* — Hooman Houshmand

(57) ABSTRACT

A method for controlling data transfers through a computer system is provided. First information is transferred to a first node of the computer system regarding availability of a first data storage area within a second node of the computer system for data to be transferred through the second node. Also transferred to the first node is second information regarding availability of a second data storage area within the second node for data to be consumed within the second node. The first information and the second information are then processed to determine if data within the first node destined for the second node is to be transferred to the second node.

32 Claims, 4 Drawing Sheets

METHOD OF CONTROLLING DATA TRANSFERS BETWEEN NODES IN A COMPUTER SYSTEM

BACKGROUND OF THE INVENTION

Simple computer systems typically employ one or more static buses to couple together processors, memory, input/output (I/O) systems, and the like. However, more modern, high-performance computer systems often interconnect multiple processors, memory modules, I/O blocks, and so forth by way of multiple, reconfigurable, internal communication paths. For example, in the case of multiprocessing systems employing a single-instruction, multiple-data stream (SIMD) or multiple-instruction, multiple-data stream (MIMD) computer architecture, multiple processors may communicate simultaneously with other portions of the computer system for data storage and retrieval, thus requiring multiple communication paths between the processors and other parts of the system. One distinct advantage of such a system is that these paths typically provide redundancy so that a failure in one of these paths may be circumvented by the use of an alternate path through the system.

FIG. 1 provides a simplified block diagram of one possible computer system 100 employing multiple internal communication paths. A first set of endnodes 102 communicates with a second set of endnodes 104 by way of a set of switches 106. Each port 112 of the endnodes 102, 104 is coupled with a similar port 112 of one of the switches 106 by way of a communication link 108. Together, the switches 106 and the communication links 108 constitute a computer system interconnection "fabric" 101 through which the endnodes 102, 104 communicate with each other. In one particular example, each of the first set of endnodes 102 may be processors, while each of the second set of endnodes 104 may include memory, I/O processors, and the like. In addition, some endnodes 102, 104 may communicate directly with each other without the aid of one of the switches 106 by way of point-to-point links 110. Collectively, the endnodes 102, 104 and the switches 106 may be collectively identified as "nodes" of the computer system 300.

In the particular example of FIG. 1, each endnode 102, 104 is connected directly to each of the switches 106 so that several alternative communication paths exist between each of the first set of endnodes 102 and each of the second set of endnodes 104. The communication paths existing at any point in time through the interconnection fabric 101 are determined by the state of each of the switches 106. In one specific example, each of the switches 106 is a crossbar switch which connects each of its ports 112 connected with one of the first set of endnodes 102 with one of its ports 112 that is connected with one of the second set of endnodes 104. In alternative computer system configurations, the interconnection fabric may contain two or more levels of switches 106, such that each of the first set of endnodes 102 is connected with one of the second set of endnodes 104 by way of two or more switches 106. In another configuration, each of the first set of endnodes 102 may be coupled directly to each of the second set of endnodes 104 without the use of a switch 106. Innumerable other interconnection fabric configurations also exist.

As can be seen in FIG. 1, the interconnection fabric 101 provides multiple potential communication paths to each of the first and second sets of endnodes 102, 104. The computer system 100 thus possesses the ability to circumvent failures in the system 100 in order to continue operating. More specifically, a failure in one of the endnodes 102, 104, switches 106, communication links 108, or communication ports 112 may be bypassed by way of an alternate path through the fabric 101. Of course, the throughput of at least a portion of the computer system 100 may be reduced, as less than the entirety of the interconnection fabric 101 is available to facilitate communication between the endnodes 102, 104 under such conditions.

Oftentimes, however, a failure of a particular endnode 102, 104 affects more than one path through the interconnection fabric 101, thus causing a blockage for a number of endnodes 102, 104 attempting to communication with each other. For example, if a particular endnode 104 is not accepting communications from another node of the computer system 100 due to an internal defect, then any switch 106 coupling that endnode 104 with other portions of the computer system 100 may be blocked from sending communications destined for the endnode 104 and other areas of the system 100. Consequently, any communications employing the particular switch 106 could be delayed or blocked as well. Progressing in this fashion, the resulting blockage could expand across major portions of the fabric 101, causing most, if not all, of the fabric 101 to be "gridlocked," therefore disabling the entire computer system 100.

SUMMARY OF THE INVENTION

One embodiment of the present invention provides a method for controlling the transfer of data through a computer system having a first node and a second node. First information is transferred to the first node regarding availability of a first data storage area within the second node for data to be transferred through the second node. Also transferred to the first node is second information concerning availability of a second data storage area within the second node for data to be consumed within the second node. The first and second information are then processed to determine if data within the first node destined for the second node is to be transferred to the second node.

In another embodiment, a computer system is provided which includes a first node, and a second node coupled with the first node. The first node is configured to receive first information regarding availability of a first data storage within the second node for data to be transferred through the second node, receive second information regarding availability of a second data storage within the second node for data to be consumed within the second node, and process the first and second information to determine if data within the first node destined for the second node is to be transferred to the second node.

Additional embodiments and advantages of the present invention will be realized by those skilled in the art upon perusal of the following detailed description, taken in conjunction with the accompanying drawings.

DETAILED DESCRIPTION OF THE INVENTION

Figure 1:
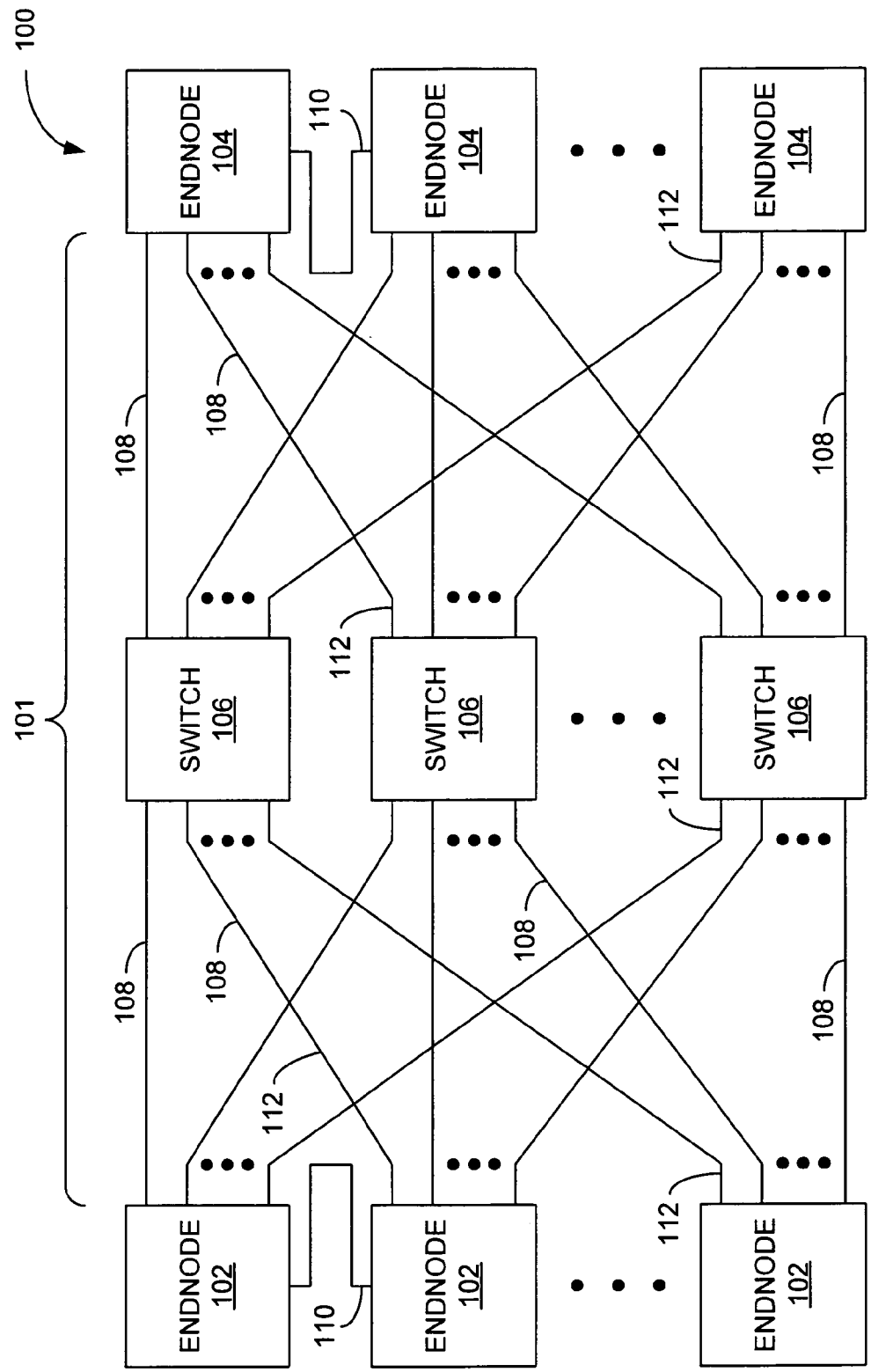
FIG. 1 is a block diagram of an example of a computer system employing an interconnection fabric from the prior art.
Figure 2:
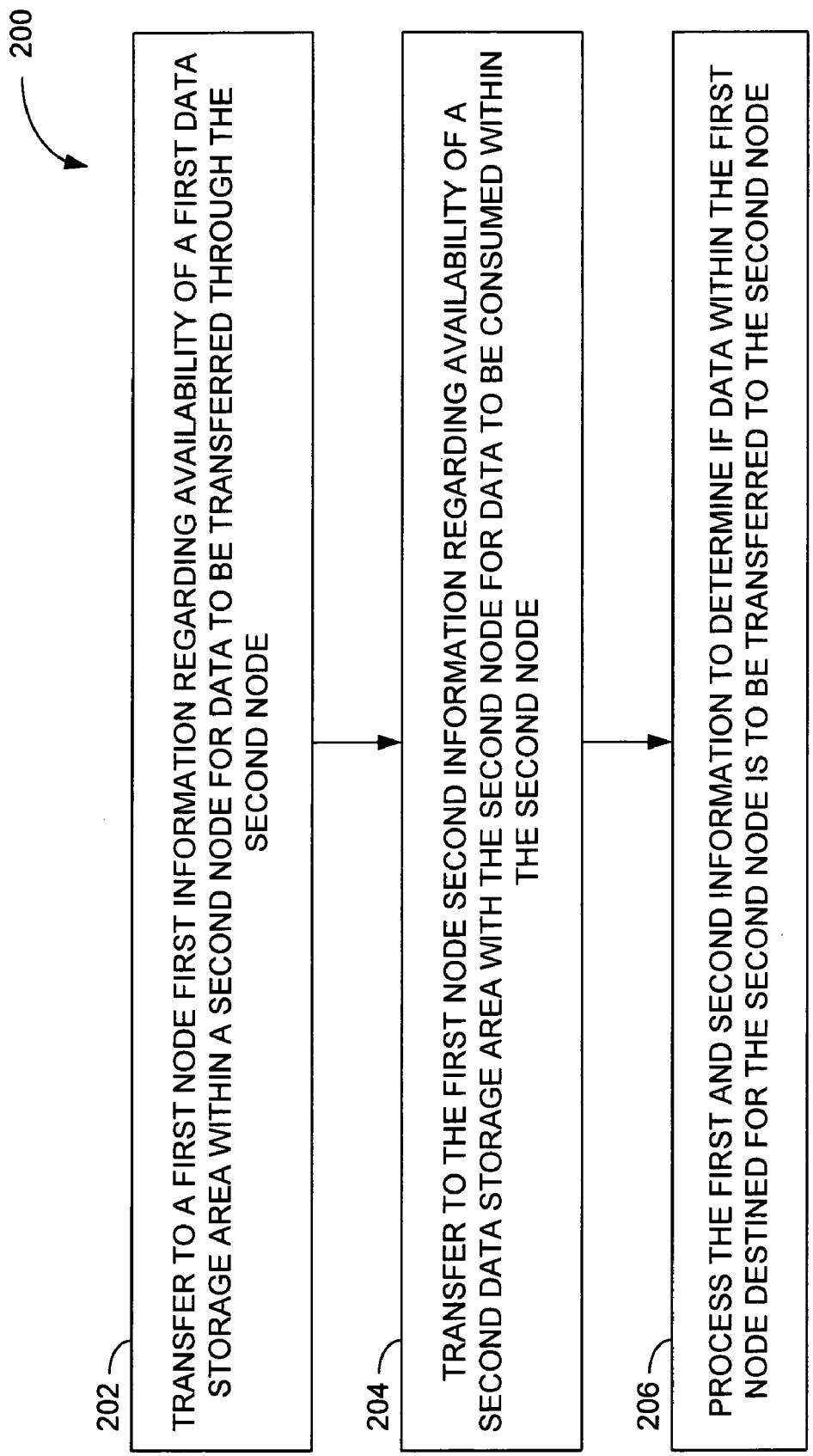
FIG. 2 is flow chart of a method according to an embodiment of the invention for controlling transfer of data through a computer system.

Generally, various embodiments of the present invention provide a method 200 for controlling the transfer of data through a computer system, as shown in FIG. 2. Transferred to a first node of the computer system, such as a first endnode, is first information regarding the availability of a first data storage area within a second node, such as a second endnode, of the computer system for data to be transferred through the second node (operation 202). Also transferred to the first node is second information regarding the availability of a second data storage area with the second node for data to be consumed within the second node (operation 204). The first and second information are then processed to determine if data within the first node destined for the second node is to be transferred to the second node (operation 206). The data transferred to the second node may either be consumed by the second node, or transferred by the second node to another nearby node. As used herein, "data" may refer to customer data, control or status information, and so forth. The method can be implemented in a digital storage medium as software instructions for executing on a processor.

Figure 3:
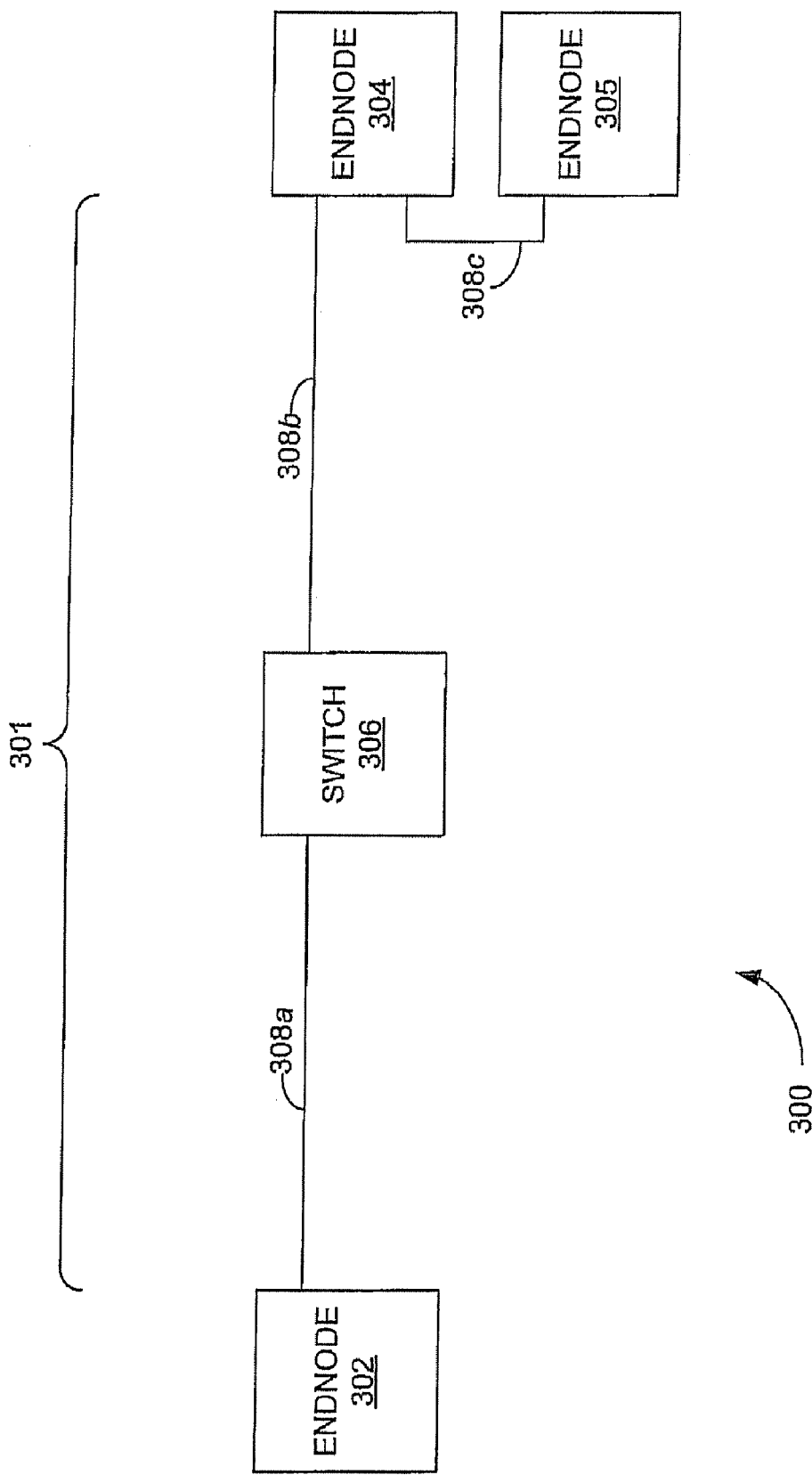
FIG. 3 is a simplified block diagram of a portion of a computer system employing a method for controlling data transfers therewithin according to an embodiment of the invention.

FIG. 3 depicts a portion of a computer system 300 having an interconnection fabric 301. The system 300 employs a method according to a particular embodiment of the invention for controlling data transfers across the interconnection fabric 301 in order to alleviate blockage caused by a failing endnode which may adversely affect other communication traffic through the fabric 301. In this case, a first endnode 302 and a second endnode 304 ordinarily communicate through a switch 306, a first communication link 308a between the first endnode 302 and the switch 306, and a second communication link 308b between the second endnode 304 and the switch 306. In addition, the second endnode 304 and a third endnode 305 are coupled together by way of a point-to-point communication link 308c. Normally, other endnodes, switches and communication links are provided within computer system 300, but are not shown in FIG. 3 to simplify and facilitate explanation of the embodiments of the invention disclosed herein.

The switch 306 and the communication links 308a-308c shown in FIG. 3 typically provide bidirectional communication capability among the first, second, and third endnodes 302, 304, 305. In one implementation, the switch 306 is a crossbar switch configured to allow simultaneous connections between a first set of endnodes including the first endnode 302, and a second set of endnodes including the second endnode 304. In alternative embodiments, other types of switches 306 may be employed while remaining within the scope of the invention. In still other embodiments, more, fewer, or no switches 306 may be utilized.

The endnodes 302, 304, 305 may be any functional or operational logic block that performs a computer-related task. For example, the endnodes 302, 304, 305 may include, but are not limited to, processors, memory blocks, or I/O blocks. As shown in greater detail in FIG. 4, each of the endnodes 302, 304, 305 provides one or more ports 350, such as ports 350a, 350b . . . 350n, each of which supplies its endnode 302, 304, 305 a connection with a communication link 308. In addition, each port 350a, 350b . . . 350n is normally connected within its endnode 302, 304, 305 to one or more logic blocks configured to handle the sending and receiving of data and control information between the interconnection fabric 301 and other internal circuitry of the endnode 302, 304, 305. In one example, such logic blocks may include a transport layer (TL) block 352 and a link controller (LC) block 354. In one embodiment, the TL block 352, such as block 352a, 352b . . . 352n, may be configured to package data for transfer over a communication link 308, decode or extract information received over a communication link 308, and so forth. Also, the LC block 354, such as 354a, 354b . . . 354n, in some embodiments, performs the actual signaling and handshaking of information over a communication link 308. In some embodiments, the LC block 354 may also provide queuing of ingoing and outgoing information over a communication link 308, as well as control traffic over the link 308, depending on other activity within its corresponding endnode 302, 304, 305.

Further, in one implementation, each of the TL blocks 352 within a particular endnode 302, 304, 305 may be interconnected by way of an internal crossbar switch 356 so that data may be sent from or received into the endnode 302, 304, 305 by any of a number of associated ports 350. In one example, the internal crossbar switch 356 is coupled with endnode core circuitry 358 configured to perform the functions associated with the endnode 302, 304, 305, such as arithmetic or logical data processing, I/O processing, data storage, and the like.

Figure 4:
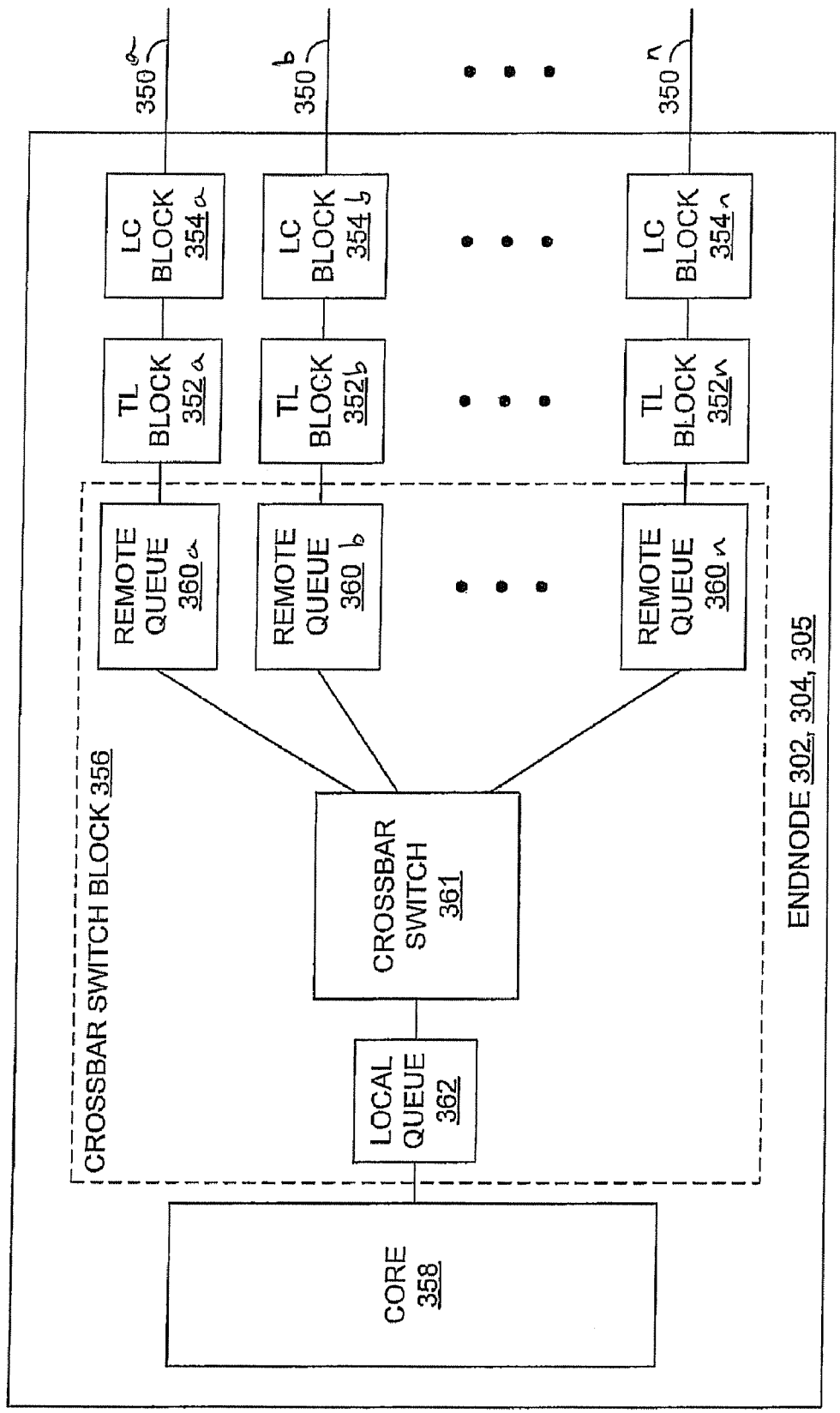
FIG. 4 is a simplified block diagram of an endnode of the computer system of FIG. 3.

Also provided within the endnode 302, 304, 305 are various data storage areas, such as queues, which provide temporary data storage for communication data that will be transferred out from the endnode 302, 304, 305. Typically, an outbound remote queue 360, such as 360a, 360b . . . 360n, exists for each port 350 coupled with a communication link 308. Additionally, a local queue 362 is provided for each local destination of data received over a communication link 308. In the example of FIG. 4, a single local queue 362 is provided for the core 358, but additionally local queues for the core 358 or other internal functional blocks of the endnode 302, 304, 305 may be provided as well. The remote queues 360 and the local queue 362 may represent separate memory areas, or may be incorporated into a single data storage area. In one embodiment, a set of inbound queues (not shown in FIG. 4) may also be provided as temporary storage for data being received over a port 350 coupled with a communication link 308.

In alternative embodiments, the existence, number, location, and connection of each logical block within the endnode 302, 304, 305 may be different from that shown in FIG. 4 without departing from the scope of the invention as described in greater detail below. For example, each of the queues 360, 362 may be repositioned within its associated node without substantially affecting its data storage functionality.

Returning to FIG. 3, communication from the first endnode 302 to either the second endnode 304 or the third endnode 305 is implemented in one embodiment by way of one or more "transactions," which each include typically some amount of control information, plus possibly some amount of data, transferred from one endnode to another. Each of the transactions from the first endnode 302 to the second endnode 304 follow the path comprising the first communication link 308a, the switch 306, and the second communication link 308b, as described above. For transactions from the first endnode 302 to the third endnode 305, the same path is followed, in addition to the point-to-point link 308c coupling the second endnode 304 with the third endnode 305.

In one embodiment, decisions concerning when a transaction may be transported over a particular communication link 308 are determined by way of control information passed between the endnodes 302, 304, 305 and the switch 306. More specifically, each endnode 302, 304, 305 and switch 306 controls how many transactions, or how much data, it may receive over a particular link 308. This control is primarily dictated by the amount of free space available in a data storage area such as an outbound remote queue 360 or local queue 362 at any particular point in time. In one example, this control information exists in the form of "permissions" or "credits," which are passed from a receiving node, such as an endnode 302, 304, 305 or switch 306, to a sending node coupled with the receiving node by way of a link 308. Each number of credits indicates the amount of information the receiving node has allocated for receipt from the sending node. Typically, each credit corresponds to a predetermined amount of data, such a transaction or a portion thereof, so that for each time that amount of data is issued by the sending node to the receiving node, the sending node decrements the credit count it maintains for that receiving node. As a result, once the number of credits reaches zero or some other minimum level, the sending node ceases sending more data to the receiving node until the receiving node issues more credits to the sending node. These new credits indicate that the receiving node has freed up some available local data storage in a remote queue 360 or local queue 362, thus allowing some of the storage to be allocated for more data from the sending node.

Given the above configuration, failures or defects in an endnode 302, 304, 305 or switch 306 may cause blockages in the communication fabric 301 that affect other portions of the computer system 300 not directly related to the failing endnode 302, 304, 305 or switch 306. For example, the third endnode 305 may suffer a failure that results in no more credits being issued from the third endnode 305 to the second endnode 304. Such a condition may occur if, for example, the core 358 of the third endnode 305 is unable to consume transactions previously received from the second endnode 304, resulting in the local queue 362 associated with the core 358 to remain filled with these previous transactions. In one embodiment, when any of the local queues 362 or remote queues 360 cannot accept any more data being received by the third endnode 305, no more credits will be issued by the third endnode 305 to the second endnode 304. Thus, the second endnode 304 will be prohibited from issuing more transactions to the third endnode 305 due to a lack of credits as long as the condition persists.

Since the second endnode 304 is thus prohibited from sending any transactions destined for the third endnode 305, the remote queue 360 (shown in FIG. 4) employed within the second endnode 304 that is associated with the point-to-point link 308c will ultimately become full as well. This circumstance results in a cessation of the issuance of credits from the second endnode 304 to the switch 306 for transactions associated with the second link 308b, thus halting the switch 306 from sending transactions over the second link 308b to the second endnode 304. Continuing in this fashion, a queue within the switch 306, as well as a remote queue 360 within the first endnode 302 identified with the first link 308a, are likely to ultimately become full, thus forming a communication blockage from the first endnode 302 through the third endnode 305 along the path described herein. In addition, other switches or endnodes not explicitly shown in FIG. 3 that provide transactions to the any of the endnodes 302, 304, 305 or the switch 306 may be similarly impacted as well, possibly resulting in a widespread shutdown of the computer system 300.

In addition, a sending node attempting to send transactions to a receiving node that has not received credits from the receiving node may "timeout" after a predetermined period of time, thus terminating any further attempts to issue the transactions. In other embodiments, such a timeout may not be employed.

To alleviate the resulting blockage, the offending endnode, which in the example described above is the third endnode 305, may be indicated as defective to the surrounding nodes in communication with the defective endnode, thus allowing those nodes to dispose of transactions within their data stores that are destined for the offending endnode. Such an action would then free up data storage within these nodes, thus allowing communication traffic in those nodes bound for other portions of the computer system 300 to flow, thereby alleviating the blockage. Further, the affected communication link 308 coupling the sending node and the defected receiving node, which in this case is the point-to-point link 308c, could be disabled to prevent further data transfers to the defective endnode.

The result of this recovery process is the identification or isolation of the endnode exhibiting the failure to the other nodes in the system 300. However, this identification often cannot be made based solely on the lack of general credits that are issued by a receiving node. For example, presuming instead that the second endnode 304, as opposed to the third endnode 305, is defective, much of the same behavior experienced by the switch 306 and the first endnode 302, as well as other switches and endnodes within the system 300, will be essentially the same as that described above. Therefore, identification of the failing endnode becomes problematic without additional information being passed among the various nodes of the system 300.

In one embodiment of the invention, a receiving node may report more specific data storage availability information, such as more specific credit information, in addition to the general credit information described above. The specific credit information may indicate the free space available within a local data storage area or queue associated with a consumer of transactions located within the receiving node. In addition, other information concerning the available space of a remote queue of the receiving node for transferring data from the receiving node over another communication link may be included. This information may indicate to the sending node whether the receiving node or another system node further downstream is the source of the blockage. For example, if the specific credit information indicates that the local queue is full, and the sending node determines that this condition has existed for some predetermined period of time that general credits have been unavailable, the receiving node is likely the source of the blockage. However, if instead a remote queue is found to be full for that period of time, the blockage is further downstream.

Accordingly, the sending node, or some other portion of the computer system, may take action to help alleviate the blockage. For example, if the receiving node is the source of the problem, as indicated by a full local queue, the sending node may dispose of transactions destined for the receiving node that reside within queues of the sending node. In another embodiment, the sending node may refrain from forwarding subsequent transactions bound for the receiving node exhibiting the failure.

If, on the other hand, the specific credit information indicates that the remote queue within the receiving node is full, then any blockage being realized by the sending node may be caused further downstream from the receiving node. In that case, the sending node may allow another node, such as the receiving node, to handle the error recovery.

Employing the endnode 302, 304, 305 depicted in FIG. 4 as an example, information concerning available data storage for remote queues 360, and/or for local queues 362 associated with outbound transactions for ports of the endnode 302, 304, 305, is passed to a sending node, such as another endnode 302, 304, 305 or a switch 306. Such information, which may be presented in the form of specific credits, may be transferred in addition to the general credit information associated with the queue 360 associated with inbound transactions from the sending node, as described earlier.

To more fully explain, consider the scenario described earlier concerning a defective third endnode 305 of the computer system 300 of FIG. 3. If the core 358 (shown in FIG. 4) of the third endnode 305 is not consuming inbound communications from the second endnode 304 that reside in the local queue 362 coupled with the core 358, an indication that the local queue 362 is full may be passed periodically to the second endnode 304, along with the general credit information supplied regarding inbound data storage availability of the third endnode 305 associated with the point-to-point link 308c. If the second endnode 304 determines that this full condition has existed for some predetermined period of time, the second endnode 304 may determine that the third endnode 305 is the source of the transaction blockage, and take steps to alleviate the situation. These steps may include the disposing of transactions held by the second endnode 304 bound for the third endnode 305, and refraining from forwarding further such transactions, thereby isolating the failure within the third endnode 305 causing the blockage.

In one embodiment, specific credits or another type of data storage availability information for the other queues 360 associated with transactions outbound from the third endnode 305 may also be presented to the second endnode 304 in addition to the specific credit information associated with the local queue 362.

In a further embodiment, credits or similar information regarding data storage availability for each of the queues 360, 362 of an endnode may be organized according to whether the ultimate destination of the data to be held by the queues 360, 362 is the endnode containing the queues 360, 362. For example, for the third endnode 305, the local queue 362 associated with the core 358 may be regarded as a queue holding data whose ultimate destination is the endnode 305, since inbound data received by the local queue 362 is consumed by the core 358 within the endnode 305. Other queues of the endnode 305, such as the remote queues 360 associated with various communication links 308, may be classified as a group of queues holding outbound data ultimately destined for a node outside the third endnode 305. Thus, in addition to the general credit information for the queue 360 accepting incoming transactions over the link 308c, the second endnode 304 will receive specific credit information for local queues 362 as a group accepting transactions to be consumed by the third endnode 305, and specific credit information for remote queues 360 as a group accepting transactions to be transferred from the third endnode 305 to another area of the computer system 300.

While the second endnode 304 recognizes the third endnode 305 as the source of the failure in this case, the switch 306 will not detect the source of the error since it is coupled adjacent to the problematic endnode 305. In this situation, the specific credit information sent from the second endnode 304 to the switch 306, which indicates the availability status of the queues within the second endnode 304, will indicate that the local queue 362 associated with a transaction consumer within the second endnode 304 is not full for a predetermined period of time, as the associated core 358 is not defective in this case. Thus, the switch 306 will not determine that the second endnode 304 is failing.

However, if instead the core 358 of the second endnode 304 is the source of the defect, the switch 306 will determine by way of the specific credit information transferred periodically from the second endnode 304 to the switch 306 that the local queue 362 associated with the core 358 within the second endnode 304 is full. Further, if the switch 306 realizes that the local queue 362 of the second endnode 304 remains full for some predetermined period of time, the switch 306 will determine that the second endnode 304 is the source of the blockage, and take appropriate measures as discussed above.

In an alternative embodiment, the lack of general or specific credits identified with a particular queue 360, 362, 380 or other data storage area may not require that the queue be full, but only that it be sufficiently filled to cause the receiving node containing the queue 360, 362, 380 to suspend the issuance of more credits to a sending node. In one implementation, general or specific credits are not issued by the receiving node if the amount of unused storage space drops below a predetermined threshold.

In one embodiment, the methods heretofore described for controlling data transfers within a computer system may be performed by a link controller (LC) block 354 of an endnode 302, 304, 305, as described earlier in conjunction with FIG. 4. Such an LC block 354 may also be utilizes within a switch 306 to perform the same function. In other embodiments, other logical structures not heretofore described may be employed to similar end. Further, these methods may be implemented in digital electronic hardware, software, or some combination thereof.

While several embodiments of the invention have been discussed herein, other embodiments encompassed by the scope of the invention are possible. For example, while some embodiments of the invention as described above are specifically employed within the environment of the computer system of FIG. 3, these embodiments are provided for the purpose of explaining embodiments of the invention within a working system. Thus, other computer system architectures employing varying interconnection fabric configurations may benefit from the various embodiments. Also, while specific logic blocks of endnodes, such as crossbar switches, transport layer blocks, and link controller blocks, have been employed in the embodiments disclosed above, alternative embodiments utilizing other logic constructs are also possible. In addition, aspects of one embodiment may be combined with those of other embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for controlling transfer of data through a computer system, the method comprising:
    transferring to a first node of the computer system with a processor first information including availability of a first data storage area and a second data storage area within a second node of the computer system, wherein the first data storage area is associated with a link between the first node and the second node and wherein the second data storage area includes a local queue associated with a core of the second node;
    transferring to the first node with the processor second information including availability of the second data storage area within the second node but not the availability of the first data storage area; and
    processing the first information and the second information with the processor to determine if data within the first node destined for the second node is to be transferred to the second node based on the availability of the first storage area and the second storage area, or if the second node is a source of blockage for transactions within the computer system based on whether the second data storage has been unavailable for a period of time.

2. The method of claim 1, wherein:
data within the first data storage area is transferred from the second node via at least one port of the second node; and
data within the second data storage area is consumed by at least one consumer within the second node.

3. The method of claim 1, wherein the first information and the second information are transferred from the second node.

4. The method of claim 1, wherein processing the first information and the second information comprises determining if either of the first data storage area and the second data storage area is unavailable for a predetermined period of time; wherein the data within the first node destined for the second node is prevented from being transferred to the second node.

5. The method of claim 1, wherein the first data storage area is unavailable if an amount of unused data storage space within the first data, storage area drops below a predetermined threshold.

6. The method of claim 1, wherein the second data storage area is unavailable if an amount of unused data storage space within the second data storage area drops below a predetermined threshold.

7. The method of claim 1, further comprising processing the first information and the second information to determine if the data within the first node destined for the second node is to be disposed.

8. The method of claim 1, further comprising processing the first information and the second information to determine if a communication link configured to carry the data within the first node destined for the second node is to be disabled, thereby isolating a failure within the second node.

9. The method of claim 1, wherein the second node comprises an endnode.

10. The method of claim 1, wherein the first information and the second information comprise credits, wherein each credit indicates data storage availability for an amount of data to be transferred over a communication link from the first node to the second node.

11. A computer system, comprising:
a first node; and
a second node including a data storage area having a local queue and a remote queue, the second node coupled with the first node;
wherein the first node is configured to:
receive first information regarding availability of the remote queue within the second node, the remote queue associated with a link between the first node and the second node;
receive second information regarding availability of the local queue but not the availability of the remote queue within the second node, the local queue associated with a core of the second node; and
process the first information and the second information to determine if data within the first node destined for the second node is to be transferred to the second node based on the availability of the remote queue, or if the second node is a source of blockage for transactions within the computer system based on whether the local queue has been unavailable for a period of time.

12. The computer system of claim 11, wherein:
data within the first data storage is transferred from the second node via at least one port of the second node; and
data within the second data storage is consumed by at least one consumer within the second node.

13. The computer system of claim 11, wherein the first node is configured to process the first information and the second information to prevent the data within the first node destined for the second node to be transferred to the second node if either of the first data storage and the second data storage is unavailable for a predetermined period of time.

14. The computer system of claim 11, wherein the first data storage is unavailable if an amount of unused data storage space with the first data storage drops below a predetermined threshold.

15. The computer system of claim 11, wherein the second data storage is unavailable if an amount of unused data storage with the second data storage drops below a predetermined threshold.

16. The computer system of claim 11, wherein the first node is further configured to process the first information and the second information to determine if the data within the first node destined for the second node is to be disposed.

17. The computer system of claim 11, wherein the first node is further configured to process the first information and the second information to determine if a communication link configured to carry the data within the first node destined for the second node is to be disabled, thereby isolating a failure of the second node.

18. The computer system of claim 11, wherein the first node comprises a first endnode, and the second node comprises a second endnode.

19. The computer system of claim 11, wherein the the second node comprises an endnode.

20. The computer system of claim 11, wherein the first information and the second information comprise credits, wherein each credit comprises data storage availability for an amount of data to be transferred over a communication link coupling the first node and the second node.

21. The computer system of claim 11, wherein the first node is further configured to receive specific credit information regarding availability of another remote queue within the second node, the another remote queue associated with a link between the first node and a third node.

22. A computer system, comprising:
a first node having a first data storage;
a second node having a second data storage and coupled with the first node;
wherein the second node is configured to transfer to the first node first information concerning availability of a remote queue within the second data storage, wherein the remote queue is associated with a link between the first node and the second node, and second information concerning availability of a local queue within the second data storage but not the availability of the remote queue, and wherein the local queue is associated with a core of the second node; and
a processor configured to receive the first information and the second information to determine if data within the first node destined for the second node is to be transferred to the second node based on the availability of the remote queue, or if the second node is a source of blockage for transactions within the computer system based on whether the local queue has been unavailable for a period of time.

23. The computer system of claim 22, wherein:
data within the first data storage is transferred from the second node via at least one port of the second node; and data within the second data storage is consumed by at least one consumer within the second node.

24. The computer system of claim 22, wherein the processor is configured to determine if either of the first data storage and the second data storage is unavailable for a predetermined period of time;
wherein the data within the first node destined for the second node is prevented from being transferred to the second node.

25. The computer system of claim 22, wherein the first data storage is unavailable if an amount of unused data storage space within the first data storage drops below a predetermined threshold.

26. The computer system of claim 22, wherein the second data storage is unavailable if an amount of unused data storage space within the second data storage drops below a predetermined threshold.

27. The computer system of claim 22, wherein the processor is further configured to process the first information and the second information to determine if the data within the first node destined for the second node is to be disposed.

28. The computer system of claim 22, wherein the processor is further configured to process the first information and the second information to determine if a communication link configured to carry the data within the first node destined for the second node is to be disabled, thereby isolating a failure of the second node.

29. The computer system of claim 22, wherein the first node comprises a first endnode, and the second node comprises a second endnode.

30. The computer system of claim 22, wherein the second node comprises an endnode.

31. The computer system of claim 22, wherein the first information and the second information comprise credits, wherein each credit comprises data storage availability for an amount of data to be transferred over a communication link from the first node to the second node.

32. The computer system of claim 22, further comprising configured to transfer to the first node third information regarding availability of another remote queue within the second node, the another remote queue associated with a link between the first node and a third node.

* * * * *

UNITED STATES PATENT AND TRADEMARK OFFICE
CERTIFICATE OF CORRECTION

PATENT NO. : 7,903,556 B2  
APPLICATION NO. : 11/266549  
DATED : March 8, 2011  
INVENTOR(S) : Gregg Bernard Lesartre et al.

Page 1 of 1

It is certified that error appears in the above-identified patent and that said Letters Patent is hereby corrected as shown below:

In column 10, line 35, in Claim 19, delete "the the" and insert -- the --, therefor.

In column 12, line 17, in Claim 32, after "further" delete "comprising".

Signed and Sealed this

Thirteenth Day of September, 2011

David J. Kappos  
*Director of the United States Patent and Trademark Office*